M. VOUGA.
PROCESS OF MANUFACTURING CONDENSED MILK.
APPLICATION FILED JUNE 11, 1912.
1,062,133.
Patented May 20, 1913.
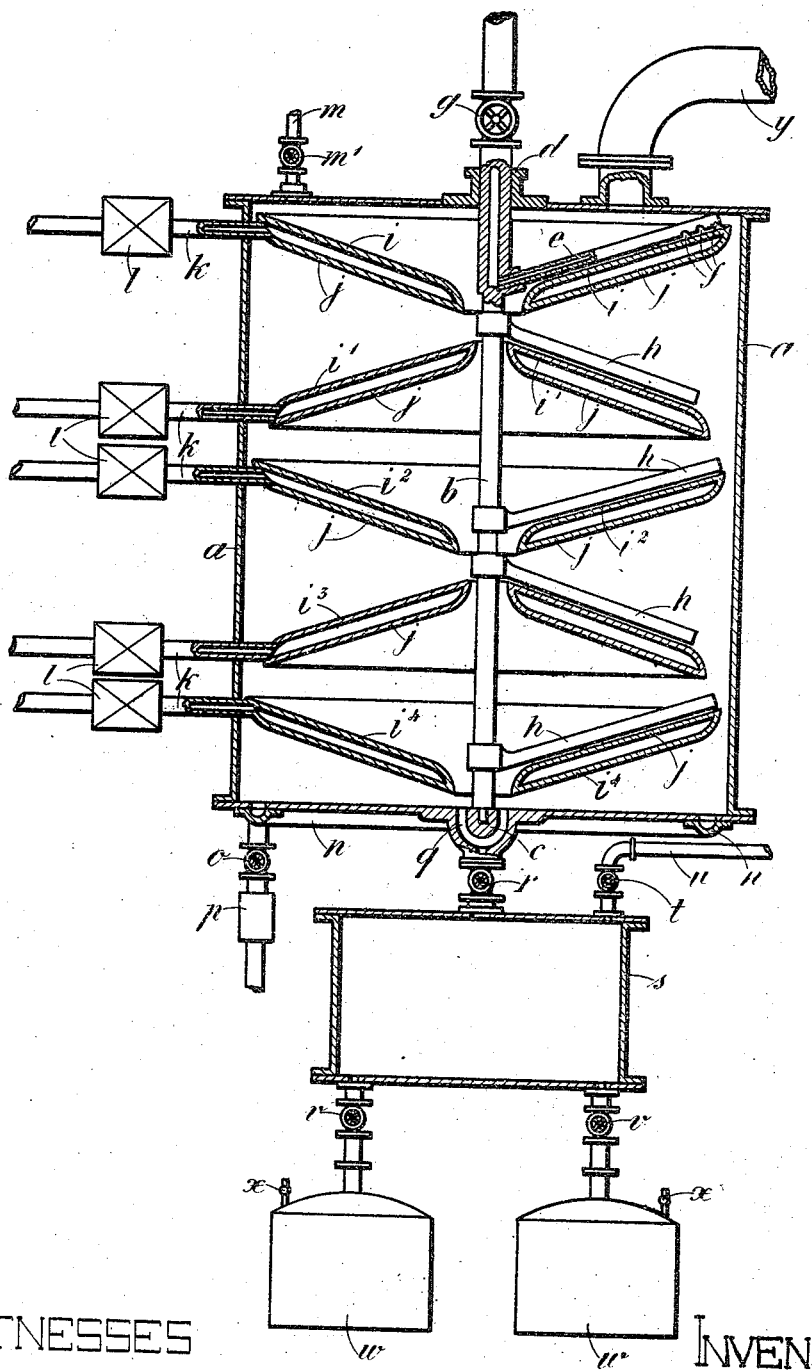

UNITED STATES PATENT OFFICE.

MAURICE VOUGA, OF CORTAILLOD, SWITZERLAND.

PROCESS OF MANUFACTURING CONDENSED MILK.

1,062,133.  Specification of Letters Patent.  Patented May 20, 1913.

Application filed June 11, 1912. Serial No. 702,968.

*To all whom it may concern:*

Be it known that I, MAURICE VOUGA, a citizen of the Swiss Republic, residing at Cortaillod, Neuchatel, Switzerland, have invented certain new and useful Improvements in Processes of Manufacturing Condensed Milk and the Like, of which the following is a specification.

This invention relates to an improved process for manufacturing condensed milk and the like.

The manufacture of condensed milk according to the known processes and with the known apparatus presents one or more of the following disadvantages, namely:— The solid constituents of the milk are burned, discolored, rendered insoluble or distasteful, or otherwise injuriously affected by excessive heating or prolonged contact with an adhesion to a heated surface; the temperature of the milk during concentration is not regulated correspondingly to the progressing concentration; the heat is not economically utilized; the output is comparatively slow.

The present invention overcomes the disadvantages aforesaid and enables the production of condensed milk in which the solid constituents are unchanged, on a commercial scale, and by simple means which may be readily kept aseptic.

The improved process consists in causing the milk to be treated, preferably while under reduced pressure and protected from impure air, to flow down a series of inclined surfaces while at the same time spreading it out in a film in a direction at an angle to that of its flow, and independently heating each surface to a temperature lower than that of the preceding one so as to heat the milk successively to temperatures corresponding to the increase in its degree of concentration.

The preferred form of apparatus for the manufacture of condensed milk, which is particularly adapted for carrying out said process, comprises the combination of a chamber the interior of which is preferably adapted to be brought under reduced pressure, a series of superposed funnels therein arranged alternately in normal and inverted positions so as to present surfaces alternately sloping downward from outward to the center and downward from the center outward and thereby forming a zigzag course for the milk to flow down, means for independently heating the funnels to different temperatures those above higher than those below, means for feeding the milk onto the uppermost funnel, and means for spreading the milk in a film around the funnels and preventing it from adhering thereto while it is flowing downward.

I have shown in the accompanying drawing by way of example a diagrammatic representation, in vertical section, of one form of construction of said apparatus.

Referring to the drawing, $a$ represents the chamber, which is preferably cylindrical in form, provided with an exhaust pipe, $y$, connected to a pump or other extractor.

$i, i', i^2, i^3, i^4$ represent the series of superposed funnels, supported within the chamber in any convenient manner and arranged alternately in normal and inverted positions as shown. The funnels are of less diameter than the cylinder so as to leave a free space at the sides for the vapors to pass up. Further, the funnels are so shaped and are of such dimensions at their center through holes and outer borders as to enable the milk to flow from one funnel onto that next below. The funnels are provided underneath with jackets, $j$, communicating with pipes, $k$, for conducting steam, or other heating medium thereto, suitable outlet or return pipes, not shown, being provided.

$l$ represents pressure reducers, or equivalent means for controlling the temperatures of the respective funnels as aforesaid. Shields may be provided over the parts of the pipes, $k$, within the chamber, $a$, to prevent the milk from coming into contact with or accumulating upon the former.

$b$ is a rotary shaft mounted within the cylinder in lower and upper bearings, $c$, $d$, respectively. At its upper end the shaft is made hollow and provided with a valve, $g$, and communicates with the interior of a hollow arm or doctor, $e$, mounted fast on the shaft above the uppermost funnel, $i$, the arm, $e$, is formed with outlet apertures, as at $f$. Other arms or doctors, $h$, are mounted fast on the shaft, respectively, one above each lower funnel. The arms may extend over the edges of the funnels. The arms may be rigid and arranged slightly out of contact with the surfaces of the funnels, or may be provided along their edges with yielding or resilient blades or strips which may contact with such surfaces.

$m$ is a conduit controlled by a valve, $m'$, for introducing steam or hot air to sterilize the apparatus.

Any water of condensation which may be deposited on the walls of the cylinder, $a$, is gathered in a drain, $n$, at the bottom of the cylinder, and from thence is conducted through a valve, $o$, into a reservoir, $p$.

In the lower bearing, $c$, are formed conduits, $q$, for conducting the condensed milk passing through the center hole of the lowermost funnel out of the cylinder, $a$, through a valve, $r$, into any convenient reservoir, $s$.

The reservoir, $s$, may communicate by outlets controlled by valves, $v$, with containers, $w$.

$u$ is a pipe, controlled by a valve, $t$, for admitting aseptic air into the reservoir, $s$, when it is desired to empty same into either container, $w$.

$x$ represents stop cocks provided on the containers, $w$. The reservoir, $s$, and the containers, $w$, are or may be readily disconnectible.

In carrying out the process by means of the apparatus described and shown, the chamber, $a$, is sterilized by introducing steam or hot air through the pipe, $m$, and the reservoir, $s$, and containers, $w$, are sterilized. The valves, $u$, $o$, $t$, $v$, being closed, and the valve, $r$, being opened, the pump or other extractor acting through the pipe $y$, is set in action. Further, the pressure valves, $l$, controlling the admission of steam to the jackets, $j$, are adjusted so that the funnels are heated to the desired respective temperatures. The milk to be treated is then introduced into the cylinder, $a$, by the valve, $g$, the hollow arm, $e$, and the outlet apertures, $f$, so that it is distributed around the upper outer border of the uppermost and hottest funnel, $i$, and flows downward toward its center all the while being spread out in a film around the funnel and prevented from adhering to its surface by the arm, $e$. The heat and reduced pressure cause the film of milk to rapidly give up a portion of its water content, and the vapor passes away by the exhaust, $y$. From the funnel, $i$, the partly condensed milk flows onto the central part of the inverted funnel, $i'$, heated to a lower temperature than the funnel, $i$, and flows downward to the outer edge of the funnel, $i'$ all the while being spread out in a film around the funnel and prevented from adhering to its surface by the respective arm, $h$, so that a further portion of the water is evaporated and passes away. From the funnel, $i'$ the still further partly condensed milk flows firstly onto the funnel, $i^2$, then onto the funnel, $i^3$, and then onto the funnel, $i^4$, as will be readily understood.

The degree to which each respective funnel should be heated may be readily ascertained for any particular construction of apparatus by known tests and reactions.

From the last funnel, $i^4$, the condensed milk flows through the conduits, $q$, and the valve, $r$, into the reservoir, $s$. The condensed milk may be emptied from the reservoir, $s$, into receptacles, $w$.

Inspection glasses may be provided to enable the operation and progress of the treatment to be watched, and manholes may be provided to facilitate cleaning.

The apparatus is of advantage in that it enables the quantity of milk treated and the temperatures to which the milk is heated to be readily regulated, further, it enables the process to be continuously carried out in one piece of apparatus.

As the whole treatment may be carried out protected from the atmosphere and under aseptic conditions, the milk may be partially treated and preserved in the containers, $w$, to be finished on a later occasion.

Although the invention has only been described with reference to treating milk, I wish it to be understood that it is particularly suitable for and that the claims are intended to cover its use for treating mixtures of milk and cocoa, milk and coffee, and the like.

Having now described my invention I claim as new and desire to secure by Letters Patent:—

The improved process of manufacturing condensed milk consisting in flowing the milk to be treated, while under reduced pressure and protected from impure air down a series of inclined surfaces simultaneously spreading it out in a film in a direction at an angle to that of its flow, and independently heating each surface to a temperature lower than that of the preceding one so as to heat the milk successively to lower temperatures corresponding to the increase of its degree of concentration, substantially as described.

In testimony whereof, I have affixed my signature in the presence of two witnesses.

MAURICE VOUGA.

Witnesses:
F. L. COLONY,
ED. F. HAEUSSLER.

Copies of this patent may be obtained for five cents each, by addressing the "Commissioner of Patents, Washington, D. C."